United States Patent [19]
Usami

[11] 4,328,431
[45] May 4, 1982

[54] LEVER SWITCH

[75] Inventor: Susumu Usami, Nagoya, Japan

[73] Assignee: Kabushiki Kaisha Tokai Rika Denki Seisakusho, Aichi, Japan

[21] Appl. No.: 101,247

[22] Filed: Dec. 7, 1979

[30] Foreign Application Priority Data

Dec. 9, 1978 [JP] Japan ............................ 53-170418[U]
Jan. 25, 1979 [JP] Japan .............................. 54-8334[U]

[51] Int. Cl.³ ............................................. H01H 3/16
[52] U.S. Cl. ............................. 307/10 R; 307/10 LS; 200/61.54; 200/61.27
[58] Field of Search ............. 307/10 R, 10 LS; 200/4, 200/61.27, 61.31, 61.34, 61.35, 61.54

[56] References Cited

U.S. PATENT DOCUMENTS 3,793,491 2/1974 Cryer ........................... 200/61.54 X
4,006,328 1/1977 Kimberlin et al. ............... 200/61.54
4,123,632 10/1978 Muto .................................. 200/61.34

Primary Examiner—Michael L. Gellner
Assistant Examiner—James L. Dwyer
Attorney, Agent, or Firm—Wenderoth, Lind & Ponack

[57] ABSTRACT

A lever switch for use in a motor vehicle which includes a switch case, a lever rotatably provided in the switch case for pivotal movement about a first support axis and also about a second support axis directed in a direction different from the first support axis, a first switch member for actuating a first functioning element by rotation of the lever about the first support axis, a second switch member for actuating a second functioning element by rotation of the lever about the second support axis. The lever is also arranged to be displaceable in its axial direction to actuate a third switch member for a third functioning element.

8 Claims, 14 Drawing Figures

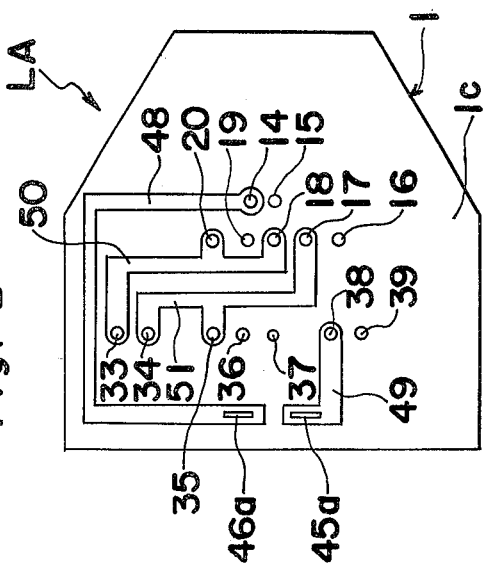
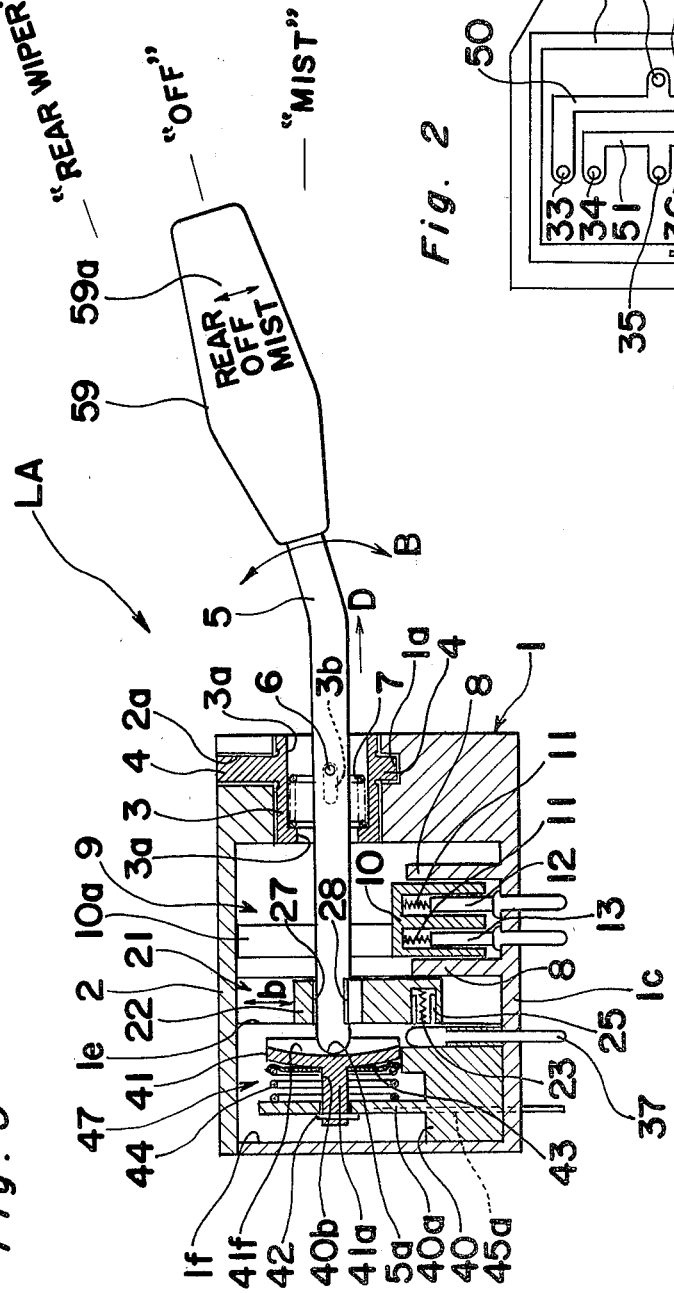

LEVER SWITCH

BACKGROUND OF THE INVENTION

The present invention generally relates to a motor vehicle and more particularly, to a lever switch for use in a motor vehicle which is capable of controlling the functions of a plurality of switching members, for example, for windshield wipers, windshield washers, horns, dimmer and passing signals, direction indicators, etc. as desired by operation of a single lever.

Recently, motor vehicles equipped with wipers on the rear windshields as well as the front windshields have been introduced, and in such motor vehicles, it has been a conventional arrangement that wiper switches are individually provided for the front and rear windshield wipers or a knob having a rear windshield wiper switch incorporated therein is mounted at a forward end of a control lever for a front windshield wiper switch so as to actuate the front windshield wipers by rotation of the control lever itself and also to actuate the rear windshield wipers by rotation of the knob. The known arrangement as described above tends to require many parts since the wiper switches for the rear and front windshield wipers are independent of each other. More specifically, in the former, operation in troublesome since the operating portions of the two wiper switches are spaced apart, while in the latter, the knob tends to be large in size, involving complicated procedures in the manufacture, although the lever and knob can be operated from one position.

Similarly, in motor vehicles in general, it has been a common practice to provide a pushbutton for a horn switch at the central portion of a steering wheel or close to a gripping portion of the steering wheel.

The conventional arrangement as described above, however, has such disadvantages that in the former, the operability is impaired, for example, in that the pushbutton can not be operated when the steering wheel is gripped, while in the latter, it becomes rather difficult to effect a horn sounding operation since the pushbutton is moved along with the rotation of the steering wheel, thus presenting a serious problem related to safety in the driving of the motor vehicle. In order to overcome the disadvantages as described above, there has conventionally been proposed an arrangement in which the horn switch and the pushbutton therefor are provided at a forward end portion, for example, of a turn signal lever disposed in the vicinity of the steering wheel. However, the above known arrangement is also disadvantageous in that, since lead wires from the horn switch must be passed through the hollow interior of the above lever which is in a pipe-like shape, the assembly thereof is complicated causing a consequent increase in the manufacturing cost, while reliability tends to be reduced, for example, due to possible damages to the covering of the lead wires.

SUMMARY OF THE INVENTION

Accordingly, an essential object of the present invention is to provide an improved lever switch for use in a motor vehicle which is superior in operability and capable of controlling as desired first and second switch members for actuating corresponding functioning elements such as windshield wipers, windshield washers, horns, dimmer and passing signals, direction indicators, etc. by operation of a single lever, while parts for the first and second switches can be integrally formed or commonly used so as to reduce the number of the parts involved owing to proximity of said two switching members for simplification of the manufacturing process and reduction of cost, with a compact knob size and superiority in design.

Another important object of the present invention is to provide an improved lever switch of the above described type which is capable of positively operating the corresponding functioning elements by favorable operability, with improved safety, stability and reliability in operation.

In accomplishing these and other objects, according to one preferred embodiment of the present invention, there is provided a lever switch for use in a motor vehicle which includes a switch case, a lever member rotatably provided in the switch case for pivotal movement about a first support axis, and also about a second support axis directed in a direction different from that of the first support axis, a first switch member for actuating a first functioning element, for example, a first windshield wiper by rotation of the lever member about the first support axis, and a second switch member for actuating a second functioning element, for example, a second windshield wiper by rotation of the lever member about the second support axis. The lever member is also displaceably supported for movement in the axial direction thereof by the switch case in such a manner that, following the axial displacement of the lever member, a third switch member for actuating a third functioning element, for example, a first windshield washer is actuated.

By the arrangement of the present invention as described above, a lever switch which is highly efficient in operation and capable of controlling the plurality of switch members by manipulation of a single lever is advantageously provided, with substantial elimination of disadvantages inherent in the conventional lever switches of this kind.

BRIEF DESCRIPTION OF THE DRAWINGS

These and other objects and features of the present invention will become apparent from the following description of preferred embodiments thereof taken in conjunction with the accompanying drawings, in which;

FIG. 2 is a bottom view of a switch case employed in the lever switch of FIG. 1, particularly showing an arrangement of stationary electrical contacts thereof, FIG. 3 is a side sectional view of the lever switch of FIG. 1.

Before the description of the present invention proceeds, it is to be noted that like parts are designated by like reference numerals throughout the several views of the accompanying drawings.

DETAILED DESCRIPTION OF THE INVENTION

Figure 1:
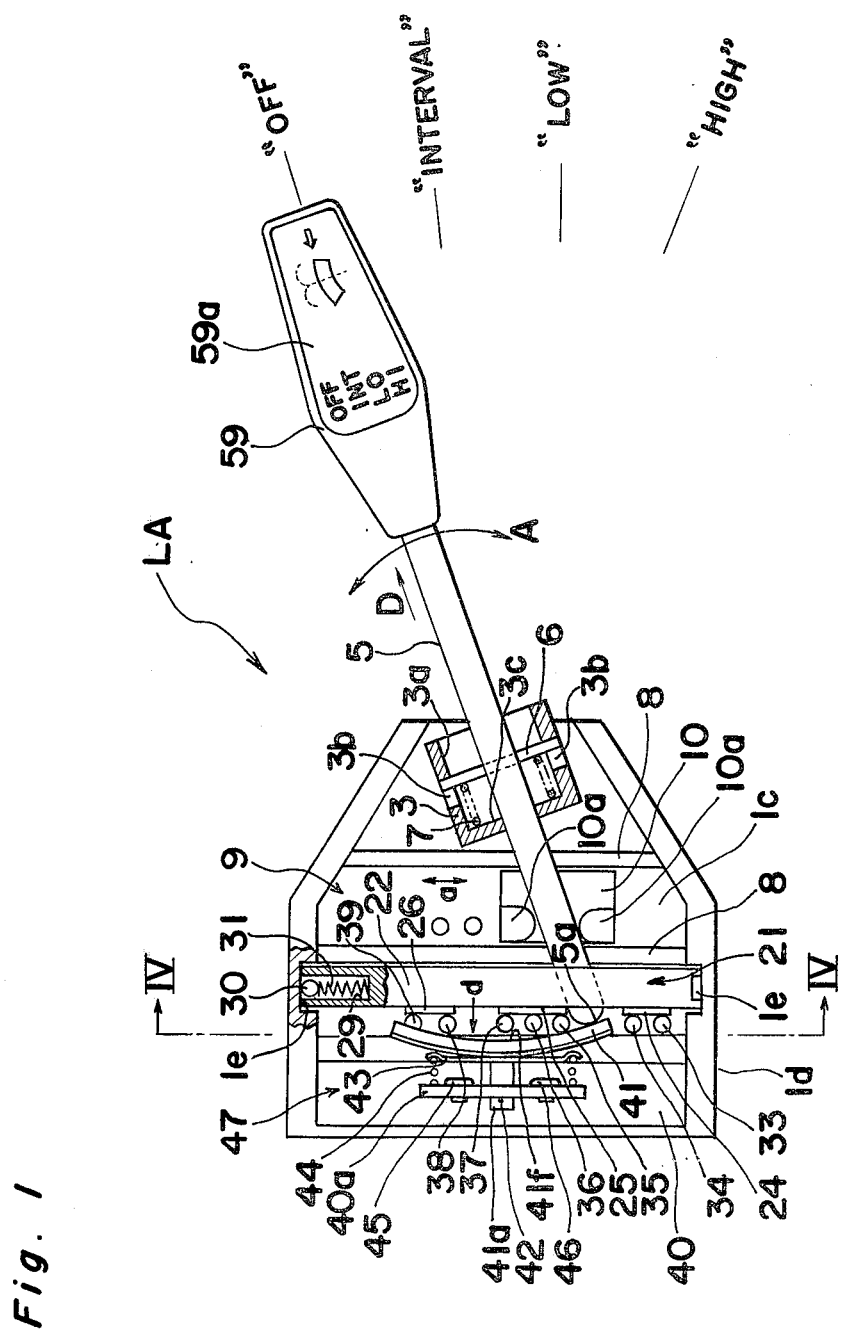
FIG. 1 is a top plan view, partly in section, of a lever switch according to one preferred embodiment of the present invention, with the upper cover plate removed for clarity.
Figure 4:
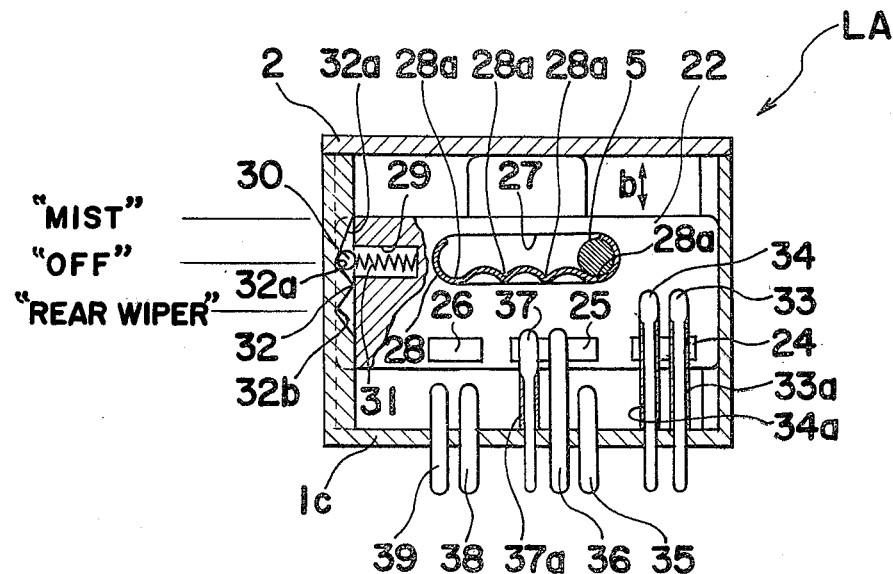
FIG. 4 is a sectional view taken along the line IV—IV of FIG. 1.

Referring now to the drawings, the present invention will be described in detail hereinbelow.

In FIGS. 1-4, there is shown a lever switch LA according to one preferred embodiment of the present invention which is for control of front and rear windshield wipers and windshield washers. The lever switch LA generally includes a switch case 1, for example of plastic material, including therein switching elements described later, a cover plate 2 mounted on an upper portion of said switch case 1, and a lever 5 associated with the switching elements in a manner as described in detail hereinbelow.

In the opposed inner faces of the switch case 1 and cover plate 2 at the right side of the switch case 1 in FIG. 1, there are formed, on a straight line, corresponding shaft holes 1a and 2a as is most clearly seen in FIG. 3. A rotary member or lever holder 3 is rotatably supported, by projections or pins 4 serving as a first support shaft, in the shaft holes 1a and 2a, and has therein a lateral opening or bore 3a, through which the lever 5 having a rounded depressing portion 5a at its distal end is axially displaceably inserted, while in the inner faces of the lever holder 3 opposed to each other across the lateral bore 3a, are elongated openings 3b directed in the same direction as the lateral bore 3a. Meanwhile, at an intermediate portion of the lever 5 located in the lever holder 3, a pin 6 is fixed which extends through the lever 5 in a direction normal to the axis of said lever 5, with the opposite ends of the pin 6 being slidably and rotatably received in the elongated openings 3b for serving as a second support shaft. Accordingly, the lever 5 is rotatable for pivotal movement in the direction of double-headed arrow B (vertically as in FIG. 3) about the pin 6, and also in the direction of double-headed arrow A (laterally as in FIG. 1) about the pins 4 received in the shaft holes 2a and 3a. In the lateral bore 3a of the lever holder 3 in a position between a collar portion 3c provided at the left side of the lateral bore 3a and the pin 6, a compression spring 7 is accommodated for normally urging the lever 5 in the direction of the arrow D. On a bottom wall 1c of the switch case 1, there are formed a pair of spaced guide rids 8 disposed approximately in parallel relation to each other, between which there is provided a first switch member 9, for example, for controlling a front windshield wiper (not shown). The first switch 9 includes an actuator or contact holder 10 of electrically insulating material slidably accommodated between the guide ribs 8 for reciprocation in the direction of double-headed arrow a in FIG. 1, a pair of movable contacts 12 and 13 disposed in corresponding openings formed in the lower surface of the contact holder 10 so as to be urged toward the bottom wall 1c of the switch case 1 by springs 11, a pair of spaced protrusions 10a formed on the upper surface of the contact holder 10 for receiving the lever 5 therebetween, with the upper ends of said protrusions 10a slidably contacting the under surface of the cover plate 2, and fixed or stationary contacts 14 and 15, and 16, 17, 18, 19 and 20 provided at predetermined positions on the bottom wall 1c so as to correspond to the movable contacts 12 and 13 respectively.

At the left side next to the first switch member 9 in FIG. 1, there is provided a second switch member 21, for example for a rear windshield wiper and mist control in this embodiment, which includes a second actuator or contact holder 22 of electrically insulating material which is slidably received, at its opposite edges, in corresponding grooves 1e formed in a vertical direction in side walls 1d of the switch case 1 for vertical reciprocation in the direction of double-headed arrow b (FIG. 3), movable contacts 24, 25 and 26 housed in corresponding openings formed at the lower portion in the left side face of the contact holder 22 so as to be urged towards the left in FIG. 3 by springs 23, an elongated opening or through-hole 27 formed in the upper portion of the contact holder 22 for accommodating the end portion of the lever 5 which extends therethrough and having a vertical dimension slightly larger than the diameter of the lever 5, a spring plate 28 accommodated in the elongated opening 27 and having four recesses 28a along the lower face of the elongated opening 27, a detent ball 30 accommodated in a lateral opening 29 formed in one side of the contact holder 22 confronting the corresponding groove 1e and urged toward said groove 1e by a spring 31, a pair of V-shaped laterally opening recesses 32a and 32b spaced in the vertical direction in the central portion of the groove 1e confronting the detent ball 30 and having a protrusion 32 therebetween, with the upper recess 32a having an inclined surface 32c for automatic restoration of the holder 22, and stationary contacts 33 and 34, 35, 36 and 37, and 38 and 39 provided on the bottom wall 1c so as to respectively correspond to the movable contacts 24, 25 and 26 of the holder 22. The stationary contacts 33 and 34 corresponding to the movable contact 24 are respectively covered around the peripheral portions thereof with insulating films 33a and 34a except for their upper and lower ends, and when the contact holder 22 is moved upward a predetermined distance to a "mist" position from the OFF position at which the ball 30 engages the recess 32a (FIG. 4), the stationary contacts 33 and 34 are shortcircuited or closed through the movable contact 24. Meanwhile, among the stationary contacts 35, 36 and 37 confronting the movable contact 25, the contact 35 is shorter in length than the other stationary contacts 36 and 37, while the stationary contact 37 is covered around its peripheral portion with an electrically insulating film 37a except for the upper and lower end portions, so that when the contact holder 22 is positioned at the OFF position, the stationary contacts 36 and 37 are closed through the movable contact 25, and at the rear windshield wiper control position where the ball 30 engages the recess 32b by displacement of the contact holder 22 downward a predetermined distance from the OFF position, the stationary contacts 35 and 36 are closed through the movable contact 25. Similarly, the stationary contacts 38 and 39 confronting the movable contact 26 are positioned to be closed by the contact 26 when the contact holder 22 is moved to the rear windshield wiper control position.

Moreover, to the left in FIG. 1 adjacent the second switch member 21, there is provided a third switch member 47, for actuating, for example a windshield washer in this embodiment, which includes a support member 40 having a plate-like rising portion 40a and disposed on the bottom wall 1c so as to be held between a wall 1f at the left of the switch case 1 and stationary contacts 33 to 39, a receiving member 41 having a shaft portion 41a slidably received in an opening 40b which is formed at the central portion of the plate-like rising portion 40a so as to be retained thereat by a retaining ring 42, with a receiving surface 41f of the receiving member 41 which faces the corresponding end of the lever 5 having a concave spherical shape conforming with the locus of movement of the end 5a of the lever 5 about the shaft portions 4 and pin 6 described earlier, a movable contact plate 43 of approximately circular shape fitted onto the shaft portion 41a of the receiving member 41, a compression spring 44 disposed between the movable contact plate 43 and the plate-like rising portion 40a for normally urging the spherical receiving surface 41f of the receiving member 41 into contact with the end 5a of the lever 5, and stationary contacts 45 and 46 fixed to the right side face of the plate-like rising portion 40a in positions corresponding to the movable contact plate 43, so that when the lever 5 is pushed or moved in a direction opposite to the arrow D against the urging force of the compression spring 44, the stationary contacts 45 and 46 are closed by the movable contact plate 43. The lever 5 is provided at the other end thereof with a control knob 59 marked with indication symbols 59a, for example, for "OFF", "INT", "LOW" and "HI" on the upper face and those for "REAR", "OFF" and "MIST" on the side face as shown in FIGS. 1 and 3.

In the above arrangement, electrically conductive plate portions 45a and 46a from the stationary contacts 45 and 46 are led out into the lower surface of the switch case 1 through the plate-like rising portion 40a of the support member 40 and bottom wall 1c of the switch case 1, and a first connecting plate 48 connects the stationary contact 14 and electrically conductive plate portion 46a, a second connecting plate 49 connects the electrically conductive plate portion 45a and fixed contact 38, a third connecting plate 50 connects the stationary contacts 18, 20 and 33, and a fourth connecting plate 51 connects the stationary contacts 17, 35 and 34 as shown in FIG. 2.

Figure 5:
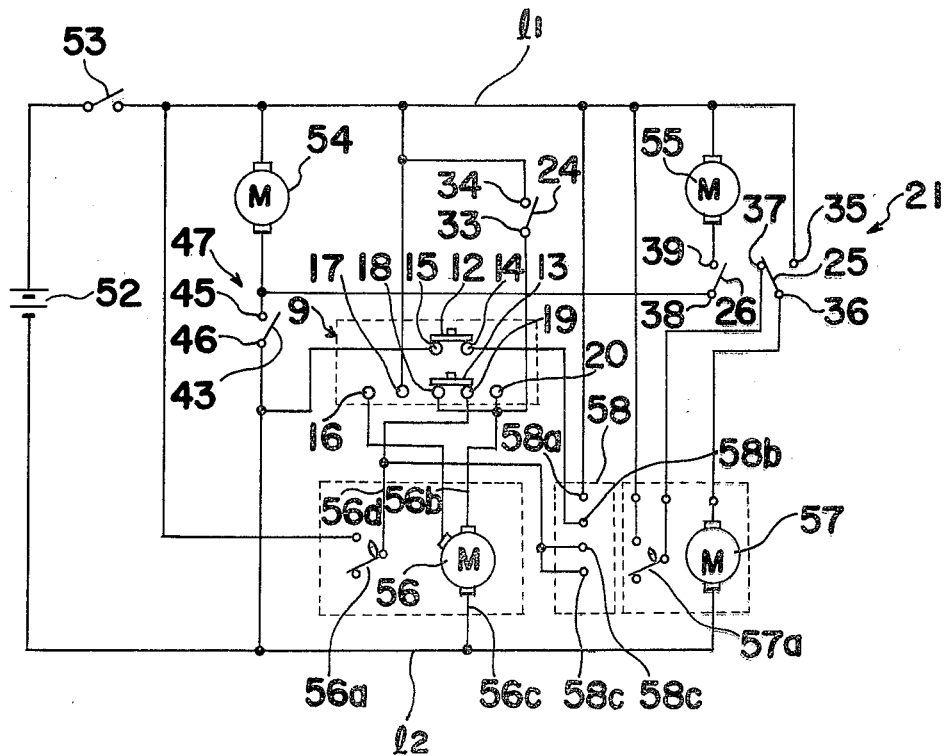
FIG. 5 is an electrical circuit diagram showing the circuit construction of the lever switch of FIG. 1.

Referring to the electrical circuit diagram of FIG. 5, a front windshield washer motor 54 for the first washer is connected to a line 11 from the positive side of a battery 52 through an ignition switch 53 and also to a line 12 from the negative side of the battery 52 through the third switch 47 including the stationary contacts 45 and 46 and movable contact 43 as described earlier. The stationary contact 45 is connected to the stationary contact 38 of the second switch 21 so as to be further connected via the movable contact 26 to the stationary contact 39 which is connected to the line 11 through a rear washer motor 55 for the second washer, while a front windshield wiper motor 56 which is coupled with a cam switch 56a for stopping at a predetermined position is connected to the stationary contacts 16, 18 and 20 through taps 56d and 56b and also to the line 12 through tap 56c. *The stationary contact 19 of the switch member 9 is connected to the line 11 through the cam switch 56a* and also to control terminals 58c of an interval control unit 58 further including a power supply terminal 58b connected to the stationary contact 14 of the first switch member 9 and another power supply terminal 58a connected to the line 11, with the stationary contact 15 of the first switch member 9 being connected to the stationary terminal 46 of the third switch member 47. The stationary contact 36 of the second switch member 21 selectively contacting the stationary contact 37 or 35 through the movable contact 25 is connected to the line 12 through a rear windshield wiper motor 57 as a second wiper, and the stationary contact 37 of the second switch member 21 is coupled to the line 11 through another cam switch 57a for stopping at a predetermined position. The stationary contact 34 of the second switch member 21 is connected to the line 11 and the stationary contact 17 of the first switch member 9, and the stationary contact 33 thereof is connected to the line from the tap 56b of the motor 56 coupled to the stationary contacts 18 and 20 of the second switch member 9.

The operation of the lever switch LA according to the present invention will be described hereinbelow.

When the lever 5 is rotated by the control knob 59 about the support shaft or pins 4 in the direction of the arrow A in FIG. 1, the contact holder 10 is correspondingly shifted in the direction of the arrow a by the lever 5, and thus, the first switch member 9 is set at a position corresponding to the movement of the contact holder 10. The first switch member 9 has four functional positions "OFF", "INTERVAL", "LOW" and "HIGH" sequentially set by movement of the lever 5 clockwise in the direction of the arrow A, at which positions, the lever 5 is selectively engaged with the corresponding recesses 28a of the plate spring 28 described earlier. During rotation of the lever 5 in the direction of the arrow A, the end portion of the lever 5 only slides longitudinally along the elongated opening 27 of the contact holder 22 without causing the holder 22 to move vertically, and the switched state of the second switch member 21 is not altered, and the third switch member 47 is not closed, since the distal end 5a of the lever 5 only slides along the spherical receiving surface 41f of the receiving member 41 without shifting the receiving member 41 in the direction of the arrow d in FIG. 1. Accordingly, when the lever 5 is set at the position "OFF", the stationary contacts 19 and 20 are closed by the movable contact 13, and the battery 52 is connected between the slow speed tap 56b and common tab 56c of the front wiper motor 56 sequentially through the ignition switch 53, cam switch 56a and stationary contacts 19 and 20. Upon setting of the lever 5 at the position of "INTERVAL", the stationary contacts 14 and 15 are closed through the movable contact 12, while the stationary contacts 18 and 19 are closed by the movable contact 13, and power from the battery 52 is supplied to the power supply terminals 58a and 58b of the interval control unit 58 through the ignition switch 53 and stationary contacts 14 and 15. Simultaneously, the positive potential intermittently generated at the control terminals 58c is supplied to the low speed tap 56b of the front wiper motor 56 through the stationary contacts 18 and 19 for intermittently actuating the front wiper motor 56. On the other hand, when the lever 5 is set at the position "LOW", the stationary contacts 17 and 18 are closed through the movable contact 13, and the power from the battery 52 is supplied to the low speed tap 56b of the front windshield wiper motor 56 through the ignition switch 53 and stationary contacts 17 and 18 for driving the motor 56 at low speed. Upon setting of the lever 5 the "HIGH" position, the stationary contacts 16 and 17 are closed by the movable contact 13, and the power from the battery 52 is applied to the high speed tap 56d of the front windshield wiper motor 56 for driving said motor 56 at high speed. Additionally, when the lever 5 is set to the "OFF" position from "LOW" or "HIGH" position, the power from the battery 52 is supplied to the low speed tap 56b through the ignition switch 53, cam switch 56a, and stationary contacts 18 and 19, and therefore, the front windshield wiper 56 is stopped at the predetermined position when the cam switch 56a is opened.

On the other hand, when the lever 5 is rotated about the pin 6 in the direction of the arrow B in FIG. 3, the contact holder 22 is moved vertically, i.e. in the direction of the arrow b so as to be selectively set at "OFF", "REAR WIPER" and "MIST" positions. During the rotation of the lever 5 in the direction of the arrow B, the lever 5 only slides vertically between the spaced protrusions 10a of the contact holder 10 without causing the holder 10 to move laterally in the direction of the arrow a in FIG. 1, and therefore, there is no possibility that the switched state of the first switch member 9 will be altered. Furthermore, since the distal end 5a of the lever 5 only slides along the spherical surface 41f of the receiving member 41 without displacing the member 41 in the direction of the arrow d in FIG. 1., the third switch member 47 is not closed. Accordingly, when the contact holder 22 is set at the "REAR WIPER" position by the lever 5, the stationary contacts 35 and 36 are closed by the movable contact 25, and thus, the power from the battery 52 is supplied to the rear windshield wiper motor 57 through the ignition switch 53 and stationary contacts 35 and 36 for driving said motor 57. When the contact holder 22 is returned from the "REAR WIPER" position to the "OFF" position by rotation of the lever 5 in the direction of the arrow B, the stationary contacts 36 and 37 are closed by the movable contact 25, so that the power from the battery 52 is supplied to the rear windshield wiper motor 57 through the ignition switch 53, cam switch 57a and stationary contacts 37 and 36, and the motor 57 is automatically stopped at the predetermined position when the cam switch 57a is opened. When the contact holder 22 is set at the "MIST" position by rotation of the lever 5 in the direction of the arrow B from the "OFF" position, the stationary contacts 33 and 34 are closed by the movable contact 24, and the power from the battery 52 is supplied to the low speed tap 56b of the front windshield wiper motor 56 for driving said motor 56. In the above state, since the ball 30 of the contact holder 22 faces the inclined surface 32c of the corresponding groove 1e, the contact holder 22 is automatically displaced in the direction of the arrow bc (upwardly in FIG. 3) upon releasing of the lever 5, and is returned to the "OFF" position. Moreover, in the above case, if the first switch member 9 is in the "OFF" state, with the stationary contacts 19 and 20 closed, the front windshield wiper motor 56 is continuously energized through the stationary contacts 19 and 20 and cam switch 56a when the contact holder 22 is changed over from the "MIST" position to the "OFF" state, and is automatically stopped at the predetermined position when the cam switch 56a is opened in the manner as described earlier.

When the lever 5 is depressed in the direction opposite to the arrow D in FIG. 1, the receiving member 41 is displaced in the direction of the arrow d in FIG. 1, and the stationary contacts 45 and 46 of the third switch member 47 are closed through the movable contact 43, in which case, if the second switch member 21 is in the "OFF" or "MIST" position, the front washer motor 54 is actuated. On the other hand, when the second switch member 21 is set at the "REAR WIPER" position, with the stationary contacts 38 and 39 closed, the front and rear windshield washer motors 54 and 55 are simultaneously driven upon closure of the third switch member 47.

As is clear from the foregoing description, in the arrangement according to the present invention, upon rotation of the lever about the first support shaft, only the first switch member for actuating the first wiper is switched over, while when the lever is rotated about the second support shaft in a direction different from that around the first support shaft, only the second switch member for actuating the second wiper is switched over, and thus, the change-over state of the first or second switch member can be altered as desired by rotating the single lever about the first or second support shaft in an extremely efficient manner. Furthermore, since the first and second switch members may be disposed close to each other in the switch case, parts for both of the switch members can be integrally formed or commonly used, with consequent decrease of the number of parts, simplification of the manufacturing process and reduction in cost. Moreover, since no switch member is accommodated in the knob, there are no disadvantages such as deterioration in operability or in design quality due to increased size of the knob as in the conventional arrangements.

Referring particularly to FIGS. 6 to 10, there is shown a modification of the arrangement of FIGS. 1 to 5. In this modification, although the general construction is similar to that of the lever switch LA of FIGS. 1 to 5, the modified lever switch LB is intended to control, for example, the direction indicator by the first switch 9', dimmer and passing signals by the second switch 21', and horn sounding by the third switch 47', and is further provided with a cancel plate P for automatically returning the lever 5 from a rightward turn indicating position R or a leftward turn indicating position L to a neutral position N in association with rotation of a steering wheel (not shown).

Figure 6:
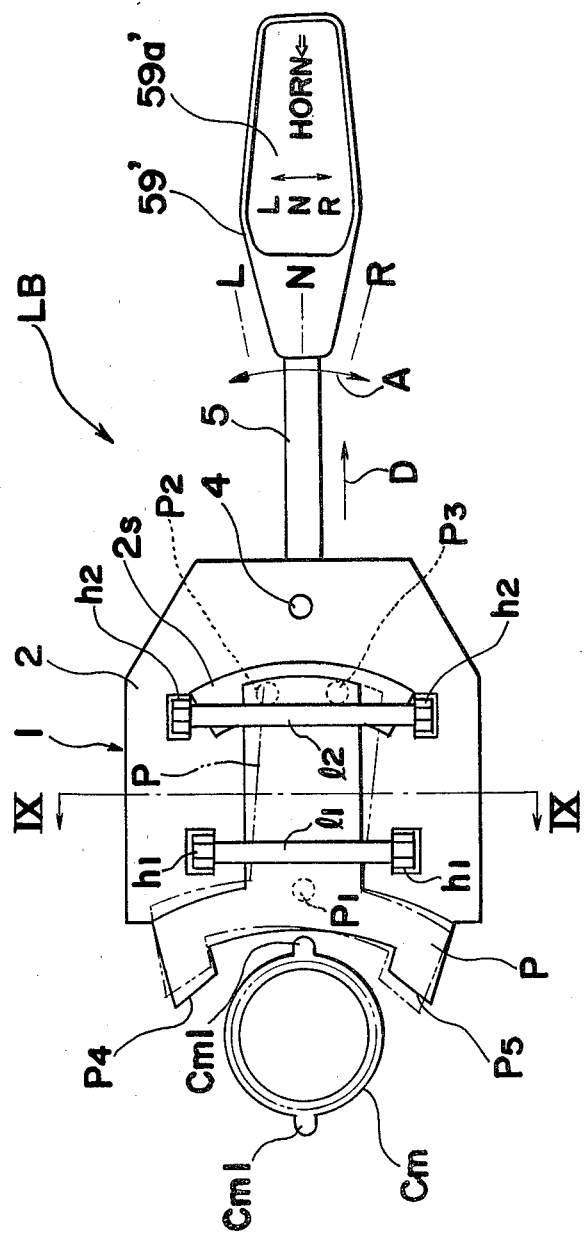
FIG. 6 is a view similar to FIG. 1, which particularly shows a modification thereof.
Figure 7:
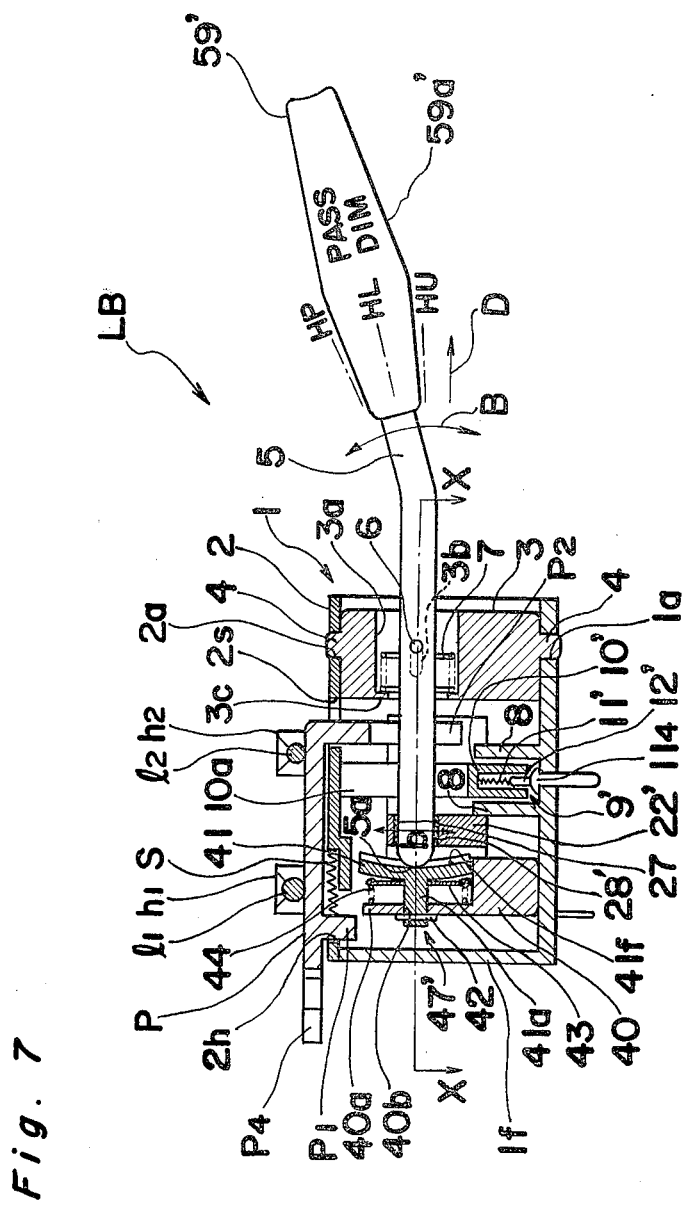
FIG. 7 is a side sectional view of the lever switch of FIG. 6.

In FIGS. 6 and 7, the knob 59' of the lever 5 has indication symbols 59a' for the rightward turn indicating position R, leftward turn indicating position L, and neutral position N on the upper surface, and those for a passing position HP, a low beam position HL and a high beam position HU on the side face.

Figure 8:
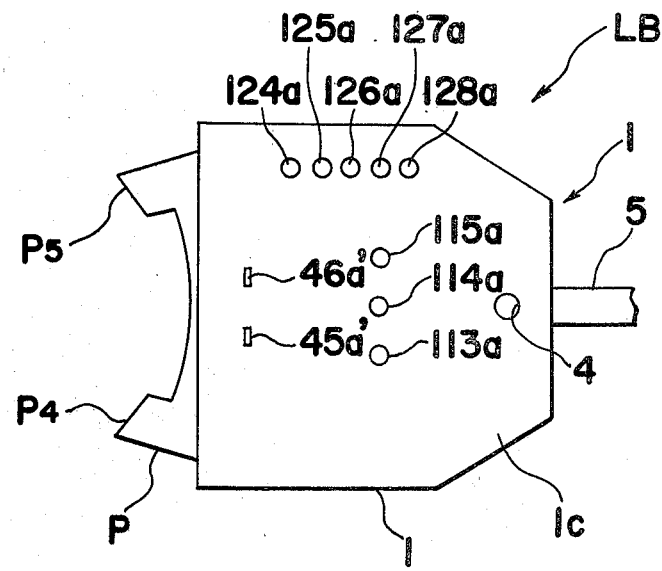
FIG. 8 is a bottom view of a switch case employed in the lever switch of FIG. 6, particularly showing an arrangement of stationary electrical contacts thereof.
Figure 9:
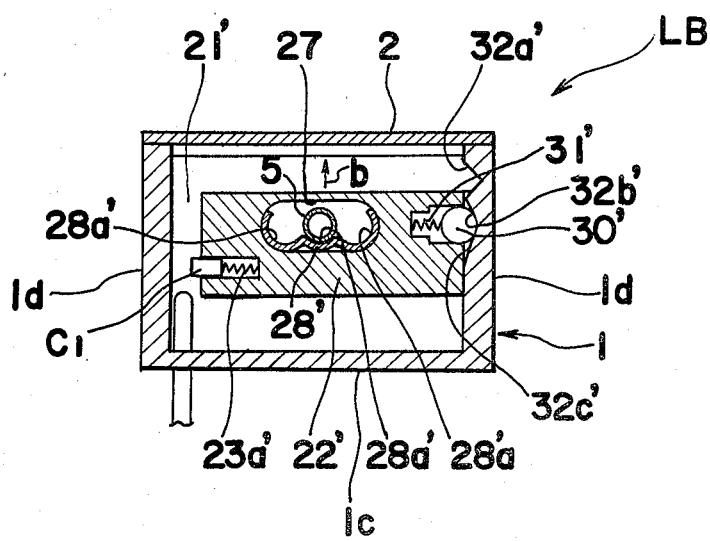
FIG. 9 is a sectional view taken along the line IX—IX of FIG. 6.
Figure 10:
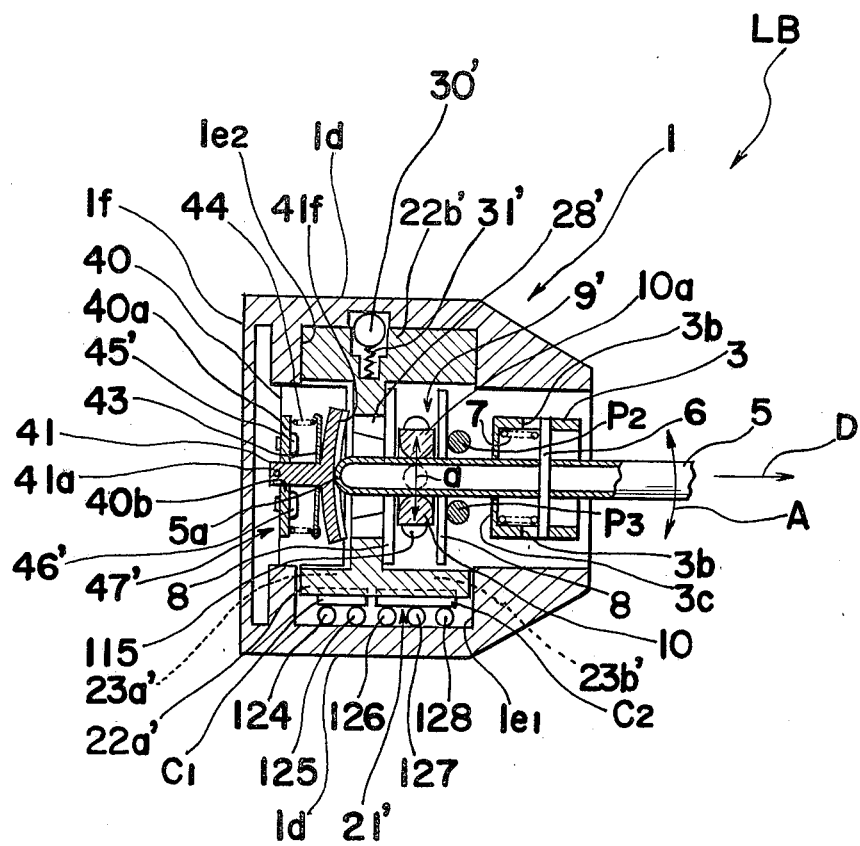
FIG. 10 is a sectional view taken along the line X—X of FIG. 7.
Figure 11:
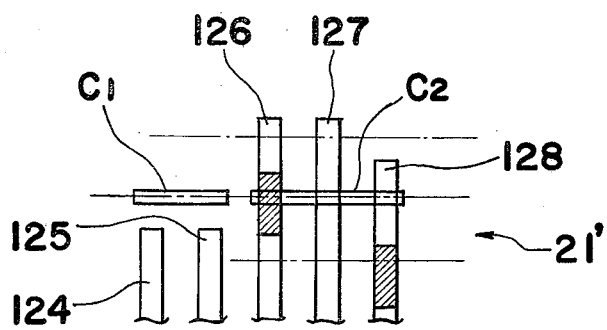
FIG. 11 is a diagram for explaining the positional relation between movable contact and stationary contacts in a second switch member employed in the lever switch of FIG. 6.

In the modified lever switch LB of FIGS. 6 to 10, the first switch member 9' for the direction indicator control includes the contact holder 10' slidably accommodated between the guide ribs 8 and having a movable contact 12' disposed in a corresponding opening formed in the under surface of the contact holder 10' so as to be urged toward the bottom wall 1c of the switch case 1 by a spring 11', and stationary contacts 113, 114 and 115 provided in the bottom wall 1c for sliding contact with the movable contact 12'. The second switch 21' for dimmer and passing control includes a second contact holder 22' provided with leg portions 22a' and 22b' at its opposite ends which are slidably received in the corresponding grooves 1e1 and 1e2 vertically formed in the side walls 1d of the switch case 1 for reciprocating movement in the direction of the arrow b (FIGS. 7 and 9). On the outer surface of the one leg portion 22a' facing the groove 1e1, rod-like movable contacts C1 and C2 urged outwardly by springs 23a' and 23b' are disposed in a line, while the detent ball 30' also urged outwardly by a spring 31' is provided on the other leg portion 22b' confronting the groove 1e2. In the groove 1e1, stationary contacts 124, 125, 126, 127 and 128 are provided for sliding contact with the movable contacts C1 and C2 for constituting the second switch 21' for dimmer and passing. In the groove 1e2, there are further provided the V-shaped recesses 32a' and 32b' (FIG. 9) for engagement with the detent ball 30' in the similar manner as in a embodiment of FIGS. 1 to 5, with the recess 32b' being provided with a gentle slope or inclined surface 32c' for permitting automatic returning. In the elongated hole 27 provided in the central portion of the second contact holder 22' through which the end portion of the lever 5 passes, a plate spring 28' having three recesses 28a' along the lower face of the hole 27 is disposed for selective engagement with the lever 5. Accordingly, by rotation of the lever 5 in the direction of the arrow A, the lever 5 is dropped into one of the recesses 28a' so as to be retained at the neutral position N, rightward turn indicating position R or leftward turn indicating position L in FIG. 6. In the above case, the first contact holder 10' is moved in the direction of the arrow a in FIG. 10, whereby the stationary contacts 113 and 114 or 114 and 115 are bridged by the movable contact 12' upon rotation of the lever 5 to the position R or L, while the stationary contacts 113 and 114 and 114 and 115 are released from the bridging by the movable contact 12' when the lever 5 is located at the neutral position N. On the contrary, when the lever 5 is rotated in the direction of the arrow B in FIG. 7, the second contact holder 22' is correspondingly moved vertically or in the direction of the arrow b for engagement of the ball 30' with the V-shaped recess 32a' or 32b', by which the lever 5 is maintained at the low beam position HL or high beam position HU shown in FIG. 7. Upon further rotation or raising of the lever 5 in the direction opposite to the arrow B up to the passing position HP, the ball 30' rides over the gently inclined surface 32c', but upon being released, the lever 5 is automatically returned to the low beam position HL by the cooperative action of the spring 31' and inclined surface 32c'. In the second switch member 21' as described above, the positional relation between the stationary contacts 124 to 128 and movable contacts C1 and C2 is as shown in FIG. 11. More specifically, when the lever 5 is located at the high beam position HU, the stationary contacts 126 and 127 are closed by the movable contact C2, while the stationary contacts 127 and 128 are bridged by the movable contact C2 when the lever 5 is at the low beam position HL. During location of the lever 5 at the passing position HP, the stationary contacts 124 and 125 are closed by the movable contact C1, and the stationary contacts 126 and 127 are also closed by the movable contact C2 respectively. As shown in FIG. 11, the stationary contacts 126 and 127 are provided with insulating layers around the peripheral surfaces thereof contacting the movable contact C2, as shown by hatching.

The third switch member 47' for horn actuation located next to the second switch member 21' has a construction generally similar to that in a embodiment of FIG. 1, and is provided with the movable contact 43 fitted onto the shaft portion 41a of the receiving member 41 supported by the rising portion 40a of the support member 40 as described with reference to FIG. 1, and the stationary contacts 45' and 46' secured to the surface of the rising portion 40a in positions corresponding to the movable contact 43.

The modified lever switch LB described so far further includes a cancel plate P for causing the lever 5 to automatically return from the rightward turn indicating position R or leftward turn indicating position L to the neutral position N in association with the rotation of the steering wheel (not shown). The cancel plate P is provided with a shaft P1 extending downwardly from its under surface and rotatably accommodated in an elongated opening 2h formed in the cover plate 2 for simultaneous movement in the axial direction (in the direction of or opposite the arrow D) of the lever 5, and a pair of spaced support leg portions P2 and P3 depending downwardly from the right side edge thereof as in FIG. 7 and inserted into the switch case 1 through an arcuate slot 25 formed in the cover plate 2 so as to hold the lever 5 therebetween. In the above arrangement, however, it is so arranged that, when the lever 5 is at the neutral position N, predetermined gaps are provided between the lever 5 and the support leg portions P2 and P3. On the other hand, stop bars 11 and 12 are fixedly held between corresponding projections h1 and h2 provided on the cover plate 2 for preventing the cancel plate P from coming off the cover plate 2. A compression spring S is disposed in the hole 2h in a position between the shaft P1 of the cancel plate P and right side edge of said hole 2h so as to normally urge the cancel plate P in the direction opposite to the arrow D. Moreover, at the left side edge of the cancel plate P in FIG. 6, a pair of confronting cam receiving portions P4 and P5 are provided and are spaced a predetermined distance from each other, while around the periphery of the steering shaft (not shown), a cancelling cam Cm having cam pieces Cm1 for contact with the cam receiving portions P4 and P5 is movably fitted for simultaneous rotation with the steering wheel. In the above arrangement, when the lever 5 is rotated, for example, to the leftward turn indicating position L, it moves the support leg portion P3 of the cancel plate P downward in the direction of the arrow A in FIG. 6, and thus, the cancel plate P is rotated about the shaft P1 in the direction of the arrow A to the position indicated by chain lines in FIG. 6. Upon turning the steering wheel counterclockwise from the above state, the cam piece Cm1 contacts the end face of one cam receiving portion P5 of the cancel plate P, but in this case, the cancel plate P only shifts in the direction of the arrow D against the urging force of the compression spring S, and thus, is not rotated or returned to the original position. Thereafter, when the steering wheel is rotated clockwise, the cam piece Cm1 contacts and depresses the side face of the cam receiving portion P5 for imparting a rotational force for returning the cancel plate P. Thus, the cancel plate P is rotated so as to be returned to the original position, whereby the lever 5 is automatically restored to the neutral position N.

In FIG. 8, there are shown terminals 113a, 114a and 115a respectively connected to the stationary contacts 113, 114 and 115, terminals 124a, 125a, 126a, 127a and 128a connected to the stationary contacts 124, 125, 126, 127 and 128, and terminals 45a' and 46a' connected to the stationary contacts 45' and 46', which terminals extend outwardly from the bottom plate 1c of the switch case 1.

Figure 12:
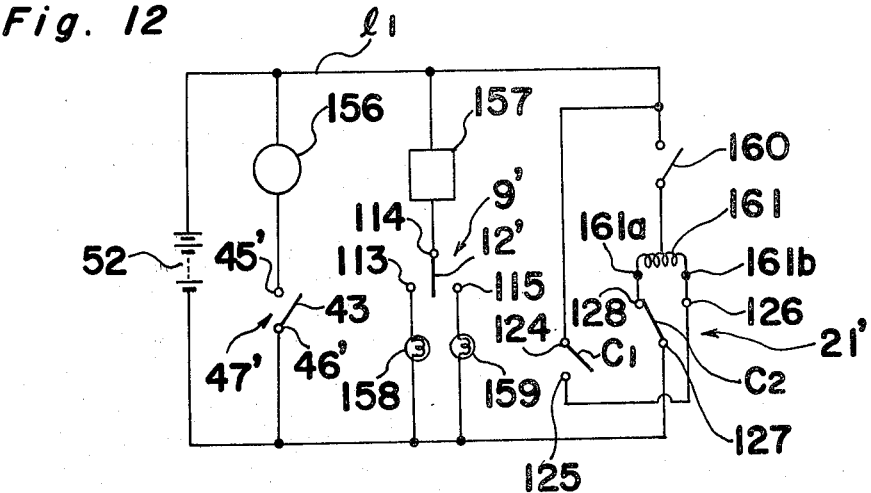
FIG. 12 is an electrical circuit diagram of the circuit construction of the lever switch of FIG. 6.

Referring to an electrical circuit diagram of FIG. 12, a horn 156 is connected to the line l1 from the positive side of the battery 52, and also to the line l2 from the negative side through the third or horn switch 47' including the stationary contacts 45' and 46', while a flasher relay 157 connected at its one side to the line l1 is coupled through the first switch 9' for direction indicator control including the stationary contacts 113, 114 and 115, to a rightward turn indication lamp 158 or a leftward turn indication lamp 159 further connected to the line l2. The line l1 is further coupled through a light switch 160, to a head lamp 161 having a low beam terminal 161a and a high beam terminal 161b, and the second switch 21' for dimmer and passing control including the stationary contacts 124, 125, 126, 127 and 128 as shown.

In the above arrangement, when the lever 5 is rotated by the knob 59' in the direction of the arrow A in FIG. 6 so as to be positioned at the rightward turn indicating position R or leftward turn indicating position L, the stationary contacts 113 and 114 or 114 and 115 are shortcircuited or closed by the movable contact 12', and thus the corresponding one of the lamps 158 and 159 is energized through the flasher relay 157 for being turned ON and OFF. In the case where the lever 5 is rotated as described above, during the period before the lever 5 contacts the support leg P2 or P3 of the cancel plate P, the lever 5 is subjected to the spring force of the plate spring 28', and after contact thereof with the support leg P2 or P3, is subjected to the urging force of the spring S in addition to the spring force of the plate spring 28', and therefore, in the course of rotation of the lever 5 in the direction of the arrow A, the feeling that a force required to rotate the lever 5 is increasing is produced. In the modified lever switch LB as described in the foregoing, since the stationary contacts 113 and 114 and 114 and 115 are arranged to be closed by the movable contact 12' immediately before the lever 5 contacts the support leg P2 or P3 during rotation of the lever 5, the rightward turn indicating lamp 158 and leftward turn indicating lamp 159 can be turned ON and OFF by rotation of the lever 5 until the feeling as described above is obtained, and in the above case, upon releasing the lever 5 from the rotation, the lever 5 is automatically returned to the neutral position N by the spring force of the plate spring 28', and thus, the arrangement may be utilized as a so-called "lane-changer" for indicating a change of course, for example, on an expressway, etc. When the lever 5 is to be rotated in the direction of the arrow A, since the lever 5 only slides in the axial direction within the hole 27 in the second contact holder 22' without moving the second contact holder 22' in the vertical direction, the switched state of the second switch 21' is not altered, while the end portion 5a of the lever 5 only slides in contact with the receiving portion 41f of the moving member 41 and does not displace the member 41 in the direction opposite to the arrow D, and therefore, the horn switch 47' is not closed in the above state.

On the other hand, upon closing of the light switch 160 when the lever 5 is, for example, at the low beam position HL, since the stationary contacts 127 and 128 of the second switch 21' are closed in the above case, the head lamp 161 is energized through the low beam terminal 161a for being lit in the low beam state. When the lever 5 is rotated from the above state to the high beam position HU, the stationary contacts 126 and 127 are closed, and thus, the head lamp 161 is energized through the high beam terminal 161b for being illuminated in the high beam state. Meanwhile, upon rotation of the lever 5 to the passing position HP, the stationary contacts 124 and 125, and 126 and 127 are respectively closed, and thus, the head lamp 161 is lit irrespective of whether the light switch 160 is closed or open. During rotation of the lever 5 in the direction of the arrow B, the lever 5 only slides vertically between the protrusions 10a of the first contact holder 10 without displacing said contact holder 10 in the direction of the arrow a in FIG. 10, and therefore, the state of the first switch 9' is not altered, and moreover, since the end 5a of the lever 5 only in sliding contact with the receiving portion 41f of the moving member 41 it does not displace said moving member 41 in the direction opposite to the arrow D, and the horn switch 47' is not closed.

On the contrary, when the lever 5 is depressed in the direction opposite to the arrow D, the receiving portion 41f of the moving member 41 is pushed by the end 5a of the lever 5, whereby the moving member 41 is displaced in the direction opposite to the direction of the arrow D without changing the state of the first and second switches 9' and 21' at all, and thus, the stationary contacts 45' and 46' of the horn switch 47' are closed to energize the horn 156. In the above case, even when the lever 5 is located in the neutral position or at any rotated position in the direction of the arrows A and B, the moving member 41 is displaced for positive sounding of the horn 156, since the end portion 5a of the lever 5 is in contact with the receiving portion 41f.

According to the modification of FIGS. 6 to 12 as described in the foregoing, since the horn switch 47' is arranged to be closed by axially depressing the lever 5 which is also used for the passing and dimmer changeover and also for the turn signals provided in the vicinity of the steering wheel, not only can horn sounding be efficiently effected, when the steering wheel is gripped by the hand, but the inconvenience in the conventional arrangement that the horn sounding operation becomes difficult to effect during rotation of the steering wheel has been overcome and troubles related to safe driving have been advantageously eliminated. Furthermore, since it is not required to pass lead wires through the lever as in the conventional arrangement having the horn switch provided at the forward end of the lever, the assembly of the lever switch is simplified, with consequent low manufacturing cost, while the possibility of reduced reliability, for example, due to damage to the covering of the lead wires, etc. has been advantageously eliminated.

Figure 13:
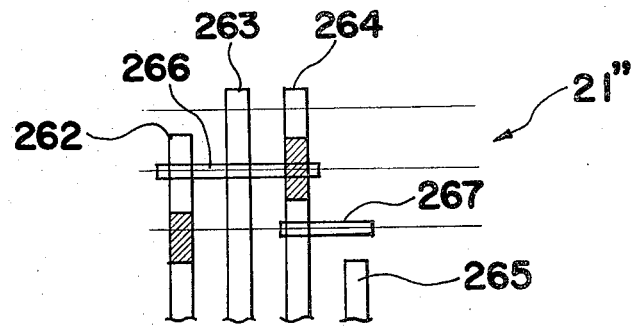
FIG. 13 is a diagram similar to FIG. 11, which particularly shows a modification thereof.
Figure 14:
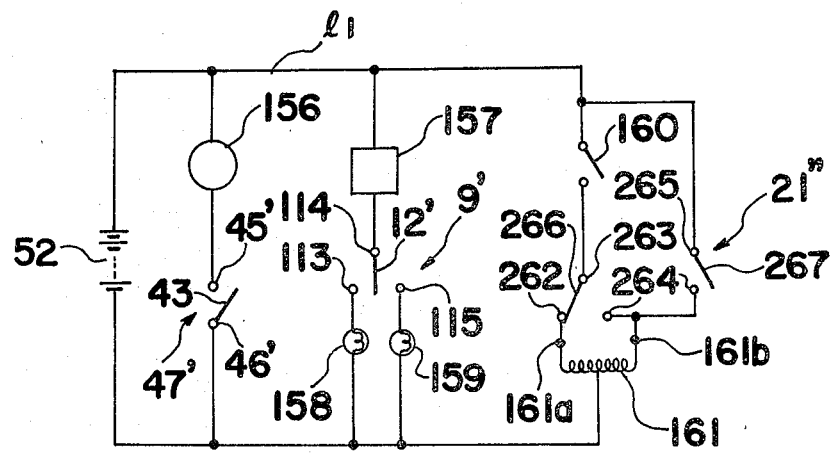
FIG. 14 is an electrical circuit diagram similar to FIG. 12 which particularly shows a modification thereof.

It should be noted here that the present invention is not limited in its application to the foregoing embodiments, but may further be modified in various ways, for example, as shown in FIGS. 13 and 14. In the modification of FIGS. 13 and 14, the five stationary contacts 124, 125, 126, 127, and 128 and the movable contacts C1 and C2 described as employed for the second switch 21' in the arrangement of FIGS. 6 to 12 are replaced by four stationary contacts 262, 263, 264 and 265 having insulating layers around the contacts 264 and 265 as indicated by hatching in FIG. 13, and corresponding movable contacts 266 and 267 constituting the modified second switch 21'', which is between the light switch 160 and head lamp 161 as shown in FIG. 14 replace the switch 21' of FIG. 12. Since the remaining construction and function of the arrangement of FIGS. 13 and 14 are similar to those of FIGS. 6 to 12, a detailed description thereof is omitted here for brevity.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed being included therein.

What is claimed is:

1. A lever actuated switch means for use in an automobile comprising:
   a casing;
   a first switch actuator movably mounted in said casing for movement back and forth in a first direction and having first switch contact means thereon;
   a second switch actuator movably mounted in said casing for movement back and forth in a second direction and having second switch contact means thereon;
   further first switch contact means in a wall of said casing and contacted by said first switch contact means on said first switch actuator at predetermined positions of said first switch actuator during its back and forth movement;
   further second switch contact means in said wall and contacted by said second switch contact means of said second switch actuator at predetermined positions of said second switch actuator during its back and forth movement; and
   a lever means extending into said casing and mounted on said casing for pivotal movement of the end of said lever means which is within the casing in the back and forth direction of movement of said first switch actuator and in the back and forth direction of movement of said second switch actuator, a portion of the length of said lever means which is within said casing being engaged with the respective first and second switch actuators for moving said switch actuators in the respective back and forth movements corresponding pivotal movement of said lever means, said lever means being further mounted in said casing for movement in the axial direction of said lever; and
   a third switch actuator movably mounted in said casing for movement in the axial direction of said lever means and engaged by the free end of said lever means in said casing and having a third switch contact means thereon, and a further third switch contact means on said wall and extending into said casing and spaced from said third switch contact means for being contacted by said third switch contact means when said lever means is moved in the direction of the axis thereof into said casing.

2. A switch means as claimed in claim 1 in which said third switch actuator has a spherically concave surface facing the free end of said lever with which said free end of said lever is in contact, whereby said free end of said lever is in contact with said third switch actuator at all pivoted positions thereof.

3. A switch means as claimed in claim 1 further comprising direction indicator circuit means for the automobile connected to said further first switch contact means and dimmer and passing signal circuit means connected to said further second switch contact means.

4. A switch means as claimed in claim 3 further comprising horn circuit means connected to said further third switch contact means.

5. A lever actuated switch means for use in an automobile comprising:
   a casing;
   a first switch actuator movably mounted in said casing for movement back and forth in a first direction parallel to a wall of said casing and having first switch contact means thereon on the side facing said wall;
   a second switch actuator movably mounted in said casing for movement back and forth perpendicular to said wall and having a plurality of contact elements thereon on the side thereof facing perpendicular to said wall and spaced along said wall;
   further first switch contact means in said wall of said casing and having the contact faces thereof substantially parallel to the plane of said wall and contacted by said first switch contact means on said first switch actuator at predetermined positions of said first switch actuator during its back and forth movement;
   second switch contact means in said wall and having a plurality of contact elements projecting upwardly from said wall and having the contact faces thereof facing said contact elements of said second switch actuator and contacted by said contact elements of said second switch actuator at predetermined positions of said second switch actuator during its back and forth movement, at least one contact element of said second switch contact means having insulation therearound extending upwardly for part of the length of the element, whereby electrical contact is broken between the element and the opposed contact element of the second switch actuator at all but a particular position of said second actuator relative to said wall; and
   a lever means extending into said casing and mounted on said casing for pivotal movement of the end of said lever means which is within the casing in the back and forth direction of movement of said first switch actuator and in the back and forth direction of movement of said second switch actuator, a portion of the length of said lever means which is within said casing being engaged with the respective first and second switch actuators for moving said switch actuators in the respective back and forth movements corresponding pivotal movement of said lever means.

6. A lever actuated switch means for use in an automobile comprising:
   a casing;
   a first switch actuator movably mounted in said casing for movement back and forth in a first direction and having first switch contact means thereon;
   a second switch actuator movably mounted in said casing for movement back and forth in a second direction and having second switch contact means thereon;
   further first switch contact means in a wall of said casing and contacted by said first switch contact means on said first switch actuator at predetermined positions of said first switch actuator during its back and forth movement;
   further second switch contact means in said wall and contacted by said second switch contact means of said second switch actuator at predetermined positions of said second switch actuator during its back and forth movement;

a lever means extending into said casing and mounted on said casing for pivotal movement of the end of said lever means which is within the casing in the back and forth direction of movement of said first switch actuator and in the back and forth direction of movement of said second switch actuator, a portion of the length of said lever means which is within said casing being engaged with the respective first and second switch actuators for moving said switch actuators in the respective back and forth movements corresponding pivotal movement of said lever means, said second switch actuator having an aperture therethrough through which the portion of the length of the lever means within the casing extends, said aperture being elongated in the direction of movement of said first switch actuator, and detent means in said second actuator and exposed within said aperture for providing distinct positions of said lever means within said aperture as said lever means is moved for moving said first actuator.

7. A lever actuated switch means for use in an automobile comprising:

a casing;

a first switch actuator movably mounted in said casing for movement back and forth in a first direction and having first switch contact means thereon;

a second switch actuator movably mounted in said casing for movement back and forth in a second direction and having second switch contact means thereon;

further first switch contact means in a wall of said casing and contacted by said first switch contact means on said first switch actuator at predetermined positions of said first switch actuator during its back and forth movement;

further second switch contact means in said wall and contacted by said second switch contact means of said second switch actuator at predetermined positions of said second switch actuator during its back and forth movement;

a lever means extending into said casing and mounted on said casing for pivotal movement of the end of said lever means which is within the casing in the back and forth direction of movement of said first switch actuator and in the back and forth direction of movement of said second switch actuator and in the axial direction of said lever means, a portion of the length of said lever means which is within said casing being engaged with the respective first and second switch actuators for moving said switch actuators in the respective back and forth movements corresponding pivotal movement of said lever means;

a first windshield wiper circuit means connected to said further first switch contact means;

second windshield wiper circuit means connected to said further second switch contact means;

a third switch actuator movably mounted in said casing for movement in the axial direction of said lever means and engaged by the free end of said lever means in said casing and having a third switch means thereon;

a further third switch contact means on said wall and extending into said casing and spaced from said third switch contact means for being contacted by said third switch contact means when said lever means is moved in the direction of the axis thereof into said casing; and windshield washer circuit means connected to said further third switch contact means.

8. A lever actuated switch means for use in an automobile comprising:

a casing;

a first switch actuator movably mounted in said casing for movement back and forth in a first direction and having first switch contact means thereon;

a second switch actuator movably mounted in said casing for movement back and forth in a second direction and having second switch contact means thereon;

further first switch contact means in a wall of said casing and contacted by said first switch contact means on said first switch actuator at predetermined positions of said first switch actuator during its back and forth movement;

further second switch contact means in said wall and contacted by said second switch contact means of said second switch actuator at predetermined positions of said second switch actuator during its back and forth movement;

a lever means extending into said casing and mounted on said casing for pivotal movement of the end of said lever means which is within the casing in the back and forth direction of movement of said first switch actuator and in the back and forth direction of movement of said second switch actuator and in the axial direction of said lever means, a portion of the length of said lever means which is within said casing being engaged with the respective first and second switch actuators for moving said switch actuators in the respective back and forth movements corresponding pivotal movement of said lever means;

a third switch actuator movably mounted in said casing for movement in the axial direction of said lever means and engaged by the free end of said lever means in said casing and having a third switch contact means thereon;

a further third switch contact means on said wall and extending into said casing and spaced from said third switch contact means for being contacted by said third switch contact means when said lever means is moved in the direction of the axis thereof into said casing;

first windshield wiper circuit means connected to the further second switch contact means contacted by said second switch contact means in a first position of said second actuator and second windshield wiper means connected to the further second switch contact means contacted by said second switch contact means in a second position of said second actuator; and further circuit means connected to said further third switch contact means and to said first and second windshield wiper circuit means for, when said lever means is moved axially and is pivoted for moving said second actuator to one of said first and second positions, energizing the other of said windshield wiper circuit means whereby both windshield wipers are operated.

* * * * *